H. WALTER, Sr.
MACHINE FOR PREPARING TOBACCO.
No 36,185. Patented Aug. 12, 1862.
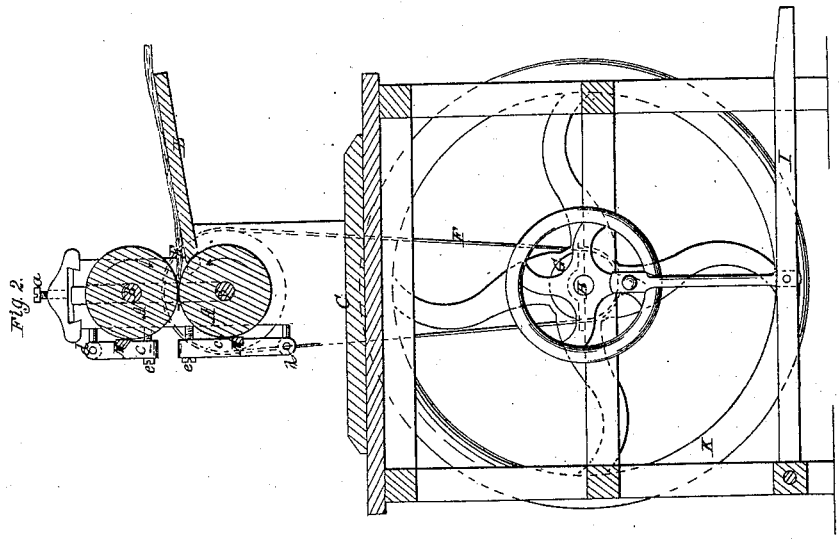
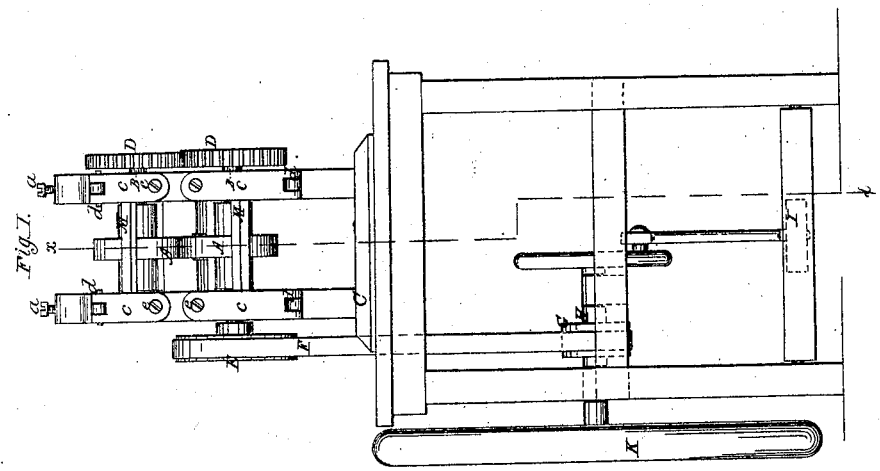
Witnesses:
Inventor:
Henry Walter Sr.

UNITED STATES PATENT OFFICE.

HENRY WALTER, SR., OF ELIZABETH CITY, NEW JERSEY.

IMPROVEMENT IN MACHINES FOR PREPARING TOBACCO.

Specification forming part of Letters Patent No. 36,185, dated August 12, 1862.

*To all whom it may concern:*

Be it known that I, HENRY WALTER, Sr., of Elizabeth City, in the county of Essex and State of New Jersey, have invented a new and useful Improvement in the Preparation of Tobacco-Leaves; and I do hereby declare that the following is a full, clear, and exact description of the same, reference being had to the accompanying drawings, forming a part of this specification, in which—

Figure 1 represents a front elevation of my invention. Fig. 2 is a longitudinal vertical section of the same, the plane of section being indicated by the line $x$ $x$, Fig. 1.

Similar letters of reference in both views indicate corresponding parts.

The object of this invention is to prepare the stalks of tobacco-leaves so that they can be used with the leaves for fillers of cigars, no stripping being required.

The invention consists in passing the leaves of tobacco through between rollers arranged so as to act on and compress the stalks without touching or injuring the leaf itself, thereby flattening said stalks and rendering the same fit to be used with the rest of the leaf for fillers of cigars.

To enable those skilled in the art to make and use my invention, I will proceed to describe it with reference to the drawings.

A A are two rollers, which are rigidly attached to axles B, that have their bearings in a plane, C. The faces of said rollers are just wide enough to act upon the stalks of the leaves, and sufficient room is left on each side of the rollers, between their ends and the inner sides of the frame C, to permit the leaves to pass through uninjured and without getting broken. The two rollers A A are geared together by cog-wheels D D, and on one of the axles B a band-wheel or pulley, E, is secured which connects by a belt, F, with a pulley, G, on the crank-shaft H, to which motion is imparted by a treadle, I, or in any other convenient manner. The crank-shaft H has its bearings in the lower part of the frame C, and a fly-wheel, K, attached to the same serves to equalize the motion. The faces of the rollers A A come close together, as clearly shown in Fig. 2 of the drawings, and the bearings or journal-boxes of the upper roller are so arranged that the same can be set closer to or farther from the lower roller by means of set-screws $a$. A feed-board, L, serves to carry the leaves to the rollers. The leaves or the stalks, in passing through between the rollers, emit a certain gum, which sticks to the faces of the rollers and renders the leaves liable to adhere to the same and to become injured. For this reason it is indispensable to apply scrapers M, one to each roller. These scrapers consist of flat blades supported on both ends by pendants $c$, which are attached to the frame C by means of pivots $d$, and which are provided with set-screws $e$, so that the cutting-edges of the blades can be brought to bear on the faces of the rollers, as clearly shown in Fig. 2 of the drawings. By passing the leaves of tobacco through between the rollers the stalks are compressed to the same thickness as the leaf proper, and the labor of stripping is obviated. The whole leaf can be used as filling of cigars, and the working of the tobacco is considerably facilitated, since the whole length of the leaves is preserved; and, besides, they (the leaves) are not so liable to become torn as when subjected to the operation of stripping.

Having thus fully described my invention, what I claim as new, and desire to secure by Letters Patent, is—

1. The employment or use, in preparing tobacco-leaves, of rollers A A or their equivalents, arranged substantially as and for the purpose described.

2. The combination of the adjustable scrapers M with the rollers A A, as and for the purpose specified.

HENRY WALTER, SR.

Witnesses:
W. HAUFF,
J. F. BUCKLE.